April 30, 1968
J. W. ORENDORFF
3,380,411
BALK REMOVER FOR PLANTERS
Filed Oct. 22, 1965
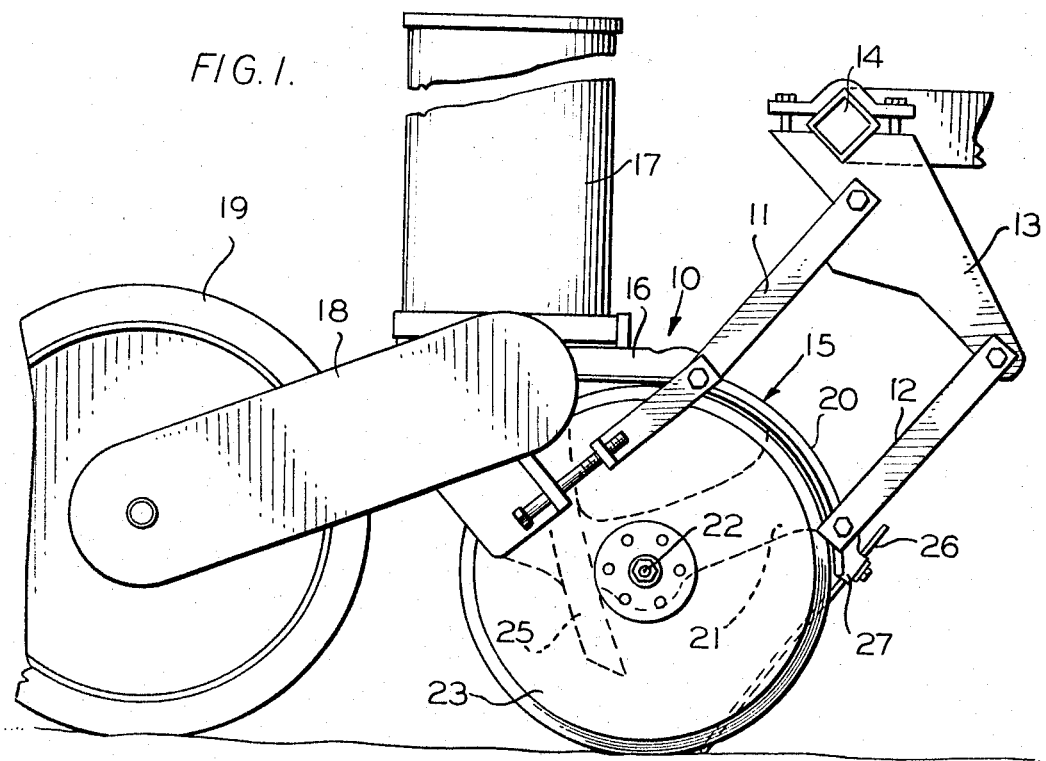
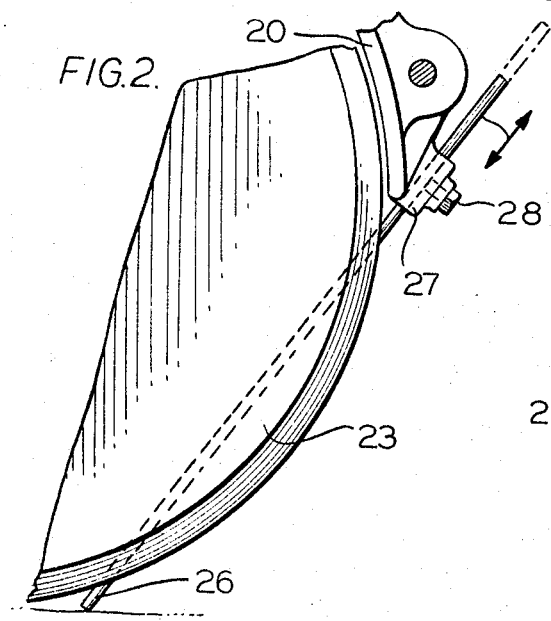
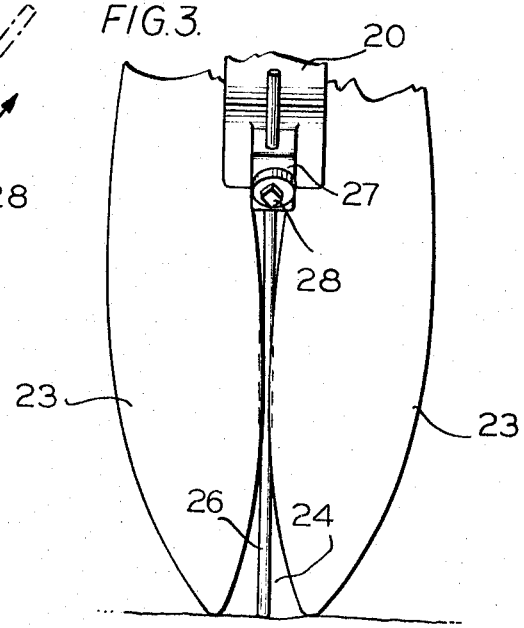
INVENTOR
JOHN W. ORENDORFF
*J. K. McNeill*
ATTORNEY

United States Patent Office 3,380,411
Patented Apr. 30, 1968

---

3,380,411
BALK REMOVER FOR PLANTERS
John W. Orendorff, Downers Grove, Ill., assignor to International Harvester Company, Chicago, Ill., a corporation of Delaware
Filed Oct. 22, 1965, Ser. No. 501,922
2 Claims. (Cl. 111—63)

ABSTRACT OF THE DISCLOSURE

In a double disk furrow opener for planters and the like the disks converge forwardly and their earth-penetrating lower edges are spaced, forming a central ridge or balk which is leveled by the provision of a flexible rod which is adjustably connected at its upper end to the disk support and extends downwardly to a location between the disks in engagement with the balk. The flexibility of the rod allows it to oscillate laterally facilitating removal of the balk.

---

This invention relates to agricultural implements and particularly to planters. More specifically, the invention concerns a novel attachment for a planter furrow opener.

A disk furrow opener usually comprises a pair of disks which converge in the direction of travel to open a furrow equal in width to the maximum spacing between the disks, and these disks usually converge forwardly, forming a generally triangularly shaped space between the adjacent edges of the disks and the ground. This causes the dirt to mound in the middle of the furrow and form a balk of earth generally in the shape of an inverted V. Seed or other material discharged into the furrow between the disks falls on the balk and divides, some sliding down one side of the balk and some the other, resulting in the seed being undesirably spaced laterally in the furrow.

To overcome this problem, the present invention has for its object the provision of means for destroying or removing this balk of earth prior to deposition of seed or other material in the furrow.

Another object of the invention is the provision of a balk-engaging member carried by the furrow opener unit extending downwardly between the disks into engagement with the balk of earth to remove the balk and allow seed to be deposited in a straight line in the middle of the furrow.

Other objects and advantages of the invention will become clear from the following detailed description when read in conjunction with the accompanying drawings wherein:

FIGURE 1 is a view in side elevation of a planter unit embodying the features of this invention.

FIGURE 2 is an enlarged detail of a portion of the structure shown in FIGURE 1 illustrating the mounting and adjustment of the balk remover of this invention, and FIGURE 3 is a front elevation of the structure shown in FIGURE 2.

In the drawings the numeral 10 designates the frame of a planter unit including vertically spaced parallel links 11 and 12 pivotally connected to a bracket 13 secured to a tool bar 14 which may be mounted on a tractor or other supporting structure.

Links 11 and 12 extend rearwardly and downwardly and are pivotally connected at their lower ends to a planter booth structure 15 having a horizontal portion 16 upon which is mounted a seed hopper 17 having dispensing mechanism, not shown, associated therewith driven by suitable sprocket and chain mechanism, contained within a housing 18, from a ground engaging wheel 19.

The frame section or boot 15 of the planter unit includes an arcuate section 20 connected to the horizontal portion 16 by a web 21 carrying a shaft member 22 upon which is mounted a pair of furrow opener disks 23 which converge forwardly and downwardly as indicated in FIGURE 3 on opposite sides of web 21. The disks 23 penetrate the ground and form a furrow the width of which is determined by the spacing between the lower edges of the disks. Between the adjacent forward edges thereof in the ground as indicated in FIGURE 3, a generally triangular space is formed with the bottom of the furrow and a balk of earth in the space 24 between the disks and the ground is formed generally in the shape of an inverted V.

Seed discharged from hopper 17 passes through a tube 25 and falls upon the triangular balk of earth, becoming laterally displaced by sliding down opposite sides thereof. In order to remove the balk and permit the seed to be deposited in the center of the furrow, a balk remover has been provided in the form of an elongated member 26 in the shape of a cylindrical rod slidably received in an opening provided in an enlargement 27 affixed to the lower end of the arcuately shaped portion 20 of the planter boot 15. The member 26 is preferably made of spring steel and is sufficiently flexible to cause it to vibrate in contact with the balk and facilitate removal of the balk and may be in a form other than a round rod, such as a flattened bar. The enlargement 27 is also tapped to receive a set screw 28 engageable with the member 26, the latter being adjustable in a vertical plane as indicated in dotted lines in FIGURE 2.

It is believed that the construction and operation of the balk remover of this invention should be clearly understood from the foregoing description. It should likewise be understood that the invention has been described in its preferred embodiment and that modifications may be made therein without departing from the spirit of the invention or the scope of the appended claims.

I claim:
1. In a material dispenser, a traveling supporting frame, a hopper mounted on the frame having therein material to be dispensed, a furrow opener mounted on the frame adapted to open a furrow in the ground for the deposition therein of said material comprising a pair of laterally spaced earth penetrating disks forming a generally triangularly shaped opening between adjacent edges of the disks and the surface of the ground, whereby a balk of earth conforming generally to the shape of said opening is formed between the disks, means for discharging material from the hopper to the furrow formed by said disks, and an elongated flexible balk removing member secured to the frame and extending downwardly therefrom midway between the lower earth penetrating edges of said disks in engagement with said balk of earth in advance of said means for discharging material from the hopper to the furrow opened by said disks, said balk removing member having lateral flexibility accommodating lateral movement of the lower balk-engaging portion thereof for leveling the balk prior to depositing the material in the furrow.

2. The invention set forth in claim 1, wherein said balk removing member is secured at its upper end to the frame at the forward end of said disks and extends at an angle downwardly and rearwardly between said disks to a location adjacent the lower edges of said disks.

References Cited

UNITED STATES PATENTS

| | | | |
|---|---|---|---|
| 324,321 | 8/1885 | Heath | 172—707 |
| 413,499 | 10/1889 | Downward | 172—707 |
| 839,310 | 12/1906 | Nelson | 172—707 XR |
| 860,416 | 7/1907 | Sparks | 111—22 |
| 2,656,801 | 10/1953 | Hansen et al. | 111—83 XR |
| 3,117,540 | 1/1964 | Shader et al. | 111—34 |
| 3,294,181 | 12/1966 | Binder | 172—708 |

FOREIGN PATENTS 840,628  6/1952  Germany.

ABRAHAM G. STONE, *Primary Examiner.*

R. C. HARRINGTON, *Assistant Examiner.*